Figure 1:
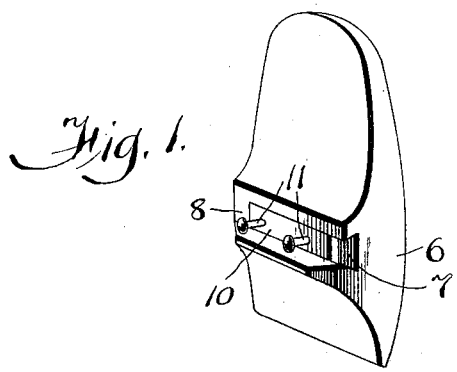

No. 656,267.   Patented Aug. 21, 1900.
B. RUBINSON.
ARTIFICIAL TOOTH.
(Application filed Jan. 25, 1900.)

(No Model.)

Witnesses
Horace G. Deitz
H. Joseph Doyle

Bernard Rubinson, Inventor by Arthur W. Harrison
his Attorney

THE NORRIS PETERS CO., PHOTO-LITHO., WASHINGTON, D. C.

UNITED STATES PATENT OFFICE.

BERNARD RUBINSON, OF PHILADELPHIA, PENNSYLVANIA, ASSIGNOR TO SAMUEL S. BLOOM, OF SAME PLACE.

ARTIFICIAL TOOTH.

SPECIFICATION forming part of Letters Patent No. 656,267, dated August 21, 1900.

Application filed January 25, 1900. Serial No. 2,780. (No model.)

*To all whom it may concern:*

Be it known that I, BERNARD RUBINSON, of Philadelphia, in the county of Philadelphia and State of Pennsylvania, have invented new and useful Improvements in Artificial Teeth; and I do hereby declare the following to be a full, clear, and exact description of said invention, reference being had to the accompanying drawings, and to the figures of reference marked thereon, which form a part of this specification.

This invention relates to artificial teeth, and has particular reference to the means whereby teeth may be firmly secured to the rubber or metal plate.

To enable artificial teeth to be secured to the mouth-plate, pins connecting the teeth and plate are almost universally used, said pins projecting from the back of the teeth. Owing to the high degree of heat required to fuse porcelain, of which the teeth are usually made, the pins employed are preferably of platinum; but this metal is very expensive, and hence other means have been attempted to secure the pins in the teeth than by locating them therein and fusing the porcelain around the pins.

The object of my invention is to provide means for firmly connecting the pins with the teeth after the latter have been fused, so that the teeth do not have to be fused about the pins, and so as to therefore be able to employ a metal which is fusible at a temperature lower than that required to fuse porcelain, but of course higher than that employed when connecting the teeth and pins to the mouth-plate. This object I attain by molding the porcelain tooth with a long and narrow slot or cavity in what is known as the "pin-flange" of the tooth, which cavity is wider on its bottom than on its top, or, in other words, has a contracted elongated opening at the rear of the tooth. This cavity is also preferably provided with an undercut extending into the solid part of the tooth at one end of the cavity, which solid part constitutes an abutment for the pin-carrying plate. After the tooth is fused a strip of metal, such as German silver or any other suitable metal, is snugly fitted to the groove or cavity in the pin-flange of the tooth, said strip of metal being provided with pins, which may either be integral therewith or may be (as they preferably are) separate from the strip and secured thereto by being soldered or screwed or riveted in suitable holes formed in the strip, said strip and its pins being complete before being put into the tooth.

My invention consists in an artificial tooth having a transverse groove or cavity formed with an abutment at one end, said cavity having a contracted elongated opening at the rear of said tooth and a metal plate or strip closely fitted in said cavity and carrying pins projecting through said contracted opening.

Figure 2:
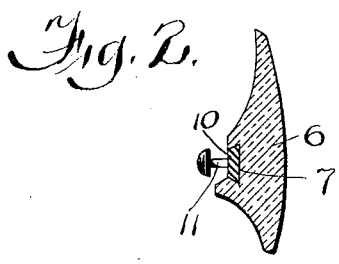
Figure 3:
Figure 6:
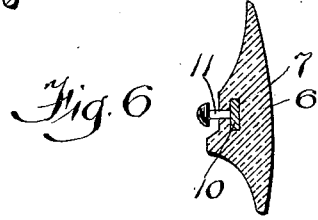
Figure 4:
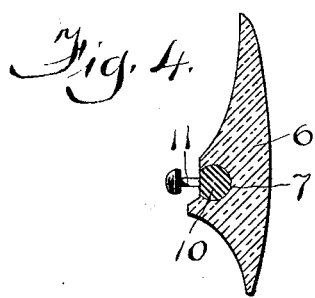
Figure 5:
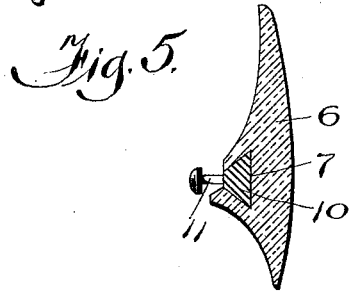

In the accompanying drawings, Figure 1 represents a perspective view of a tooth, illustrating my invention. Fig. 2 is a vertical sectional view through Fig. 1. Fig. 3 represents a horizontal section of the tooth, taken through the pin-plate. Figs. 4 and 5 are sections similar to Fig. 2, but illustrating modifications in the transverse shape of the pin-plate. Fig. 6 is a section representing another modification, hereinafter referred to.

Similar reference characters indicate similar parts throughout all the figures.

Referring first to Figs. 1, 2, and 3, the tooth is represented at 6, said tooth being formed and baked with a transverse cavity or groove 7, which cavity is open at one end and closed at the other end by an abutment 8, which abutment is preferably undercut, as shown at 9 in Fig. 3. The cavity 7 is shown as dovetailed in cross-section—that is, it is wider at the bottom than at the top—thus forming a contracted elongated opening at the rear of the tooth.

10 represents a metal plate, which may be of German silver or other suitable metal, said plate being shaped in cross-section to accurately and closely fit the cavity 7 when slipped endwise therein. The inner end of said plate 10 is beveled to fit the undercut 9 of the cavity. The headed pins 11 are formed with or rigidly secured to the plate 10, said pins forming the usual means for securing the tooth to the mouth-plate, whether the latter be of rubber or metal. To prevent relative movement of the plate 10 and the tooth after the former has been slipped into the cavity of the latter, I may insert a pin through the plate 10 and into a hole in the tooth, as indicated at 12 in Fig. 3, although this is not absolutely essential, as the relative positions of the pin-plate and the tooth will be well preserved by the material of the mouth-plate, to which the tooth and its pins are secured for use. While the pin 12 is shown in Fig. 3 as located near the middle of the plate or strip 10, it is to be understood that said pin may be used at other points in said plate, such as near either end, the position being immaterial. Instead of the locking-pin 12 cement may be employed.

While I prefer the cross-sectional shape of the cavity and the pin plate or strip as indicated in Figs. 1 and 2, the shapes of said cavity and pin-plate may be as indicated in Figs. 4 and 5, in the former of which a circular pin plate or strip is fitted to a correspondingly-shaped cavity having an elongated opening at the rear of the tooth, and in Fig. 5 the pin plate or strip is represented as substantially triangular in cross-section and fitted to a correspondingly-shaped cavity having the contracted opening at the rear of the tooth.

As shown in Fig. 6, I may form the transverse cavity substantially T-shaped in cross-section, the pin plate or strip in this case being rectangular in cross-section and fitting as shown, while the pins which are attached to the strip pass outward through the narrow slot or elongated opening.

Having now described my invention, I claim—

1. As a means for attaching artificial teeth to a mouth-plate, an elongated metal plate or strip having pins projecting from one face thereof, the pin-carrying face being of less width than the remainder of the plate or strip, said plate or strip being adapted to accurately fit a correspondingly-shaped transverse cavity in the rear of the tooth.

2. An artificial tooth having a transverse cavity with an abutment at one end, said cavity having a contracted elongated opening at the rear of said tooth, and a plate or strip closely fitted in said cavity and carrying pins projecting through said opening.

3. An artificial tooth having a transverse cavity with an undercut abutment at one end, said cavity having a contracted elongated opening at the rear of said tooth, and a plate or strip closely fitted in said cavity and having one end beveled to fit the undercut of the abutment, said plate or strip carrying pins projecting through the rear of the tooth.

4. An artificial tooth having a transverse cavity with an undercut abutment at one end, said cavity having a contracted elongated opening at the rear of said tooth, and a plate or strip closely fitted in said cavity and having one end beveled to fit the undercut of the abutment, said plate or strip carrying pins projecting through the rear of the tooth, and means for locking said plate or strip in the cavity.

In testimony whereof I affix my signature in presence of two witnesses.

BERNARD RUBINSON.

Witnesses:
  SAMUEL S. BLOOM,
  S. C. KRAUS.